UNITED STATES PATENT OFFICE.

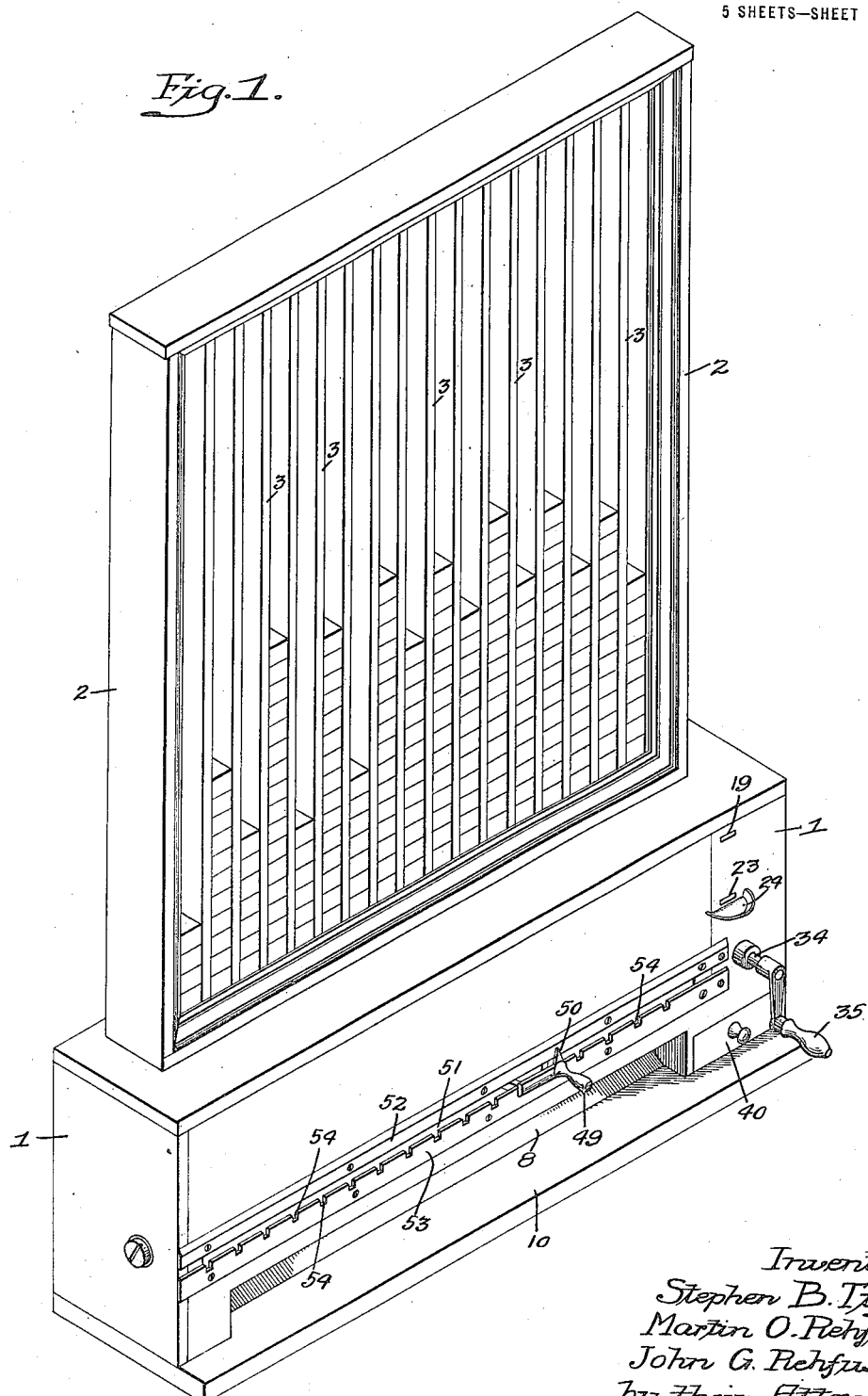

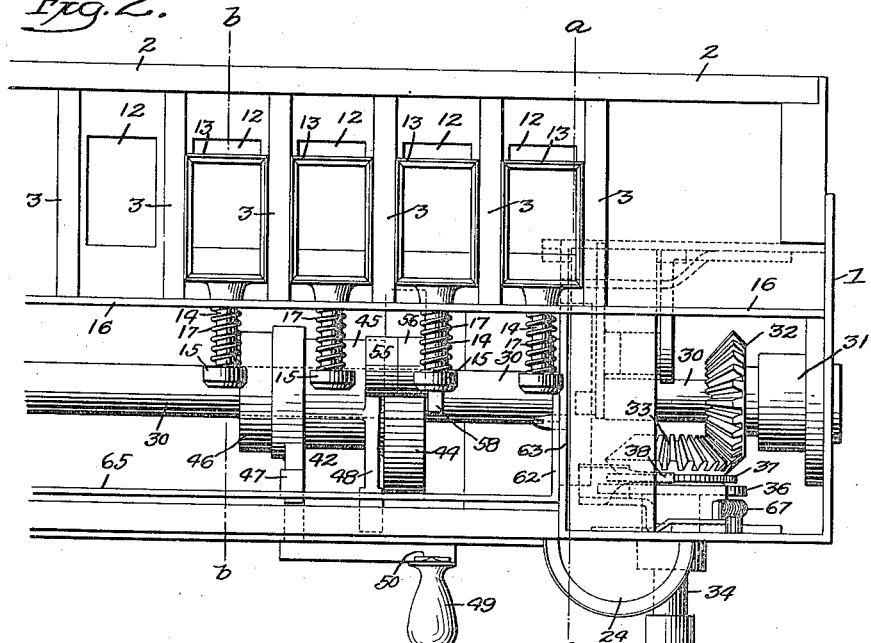
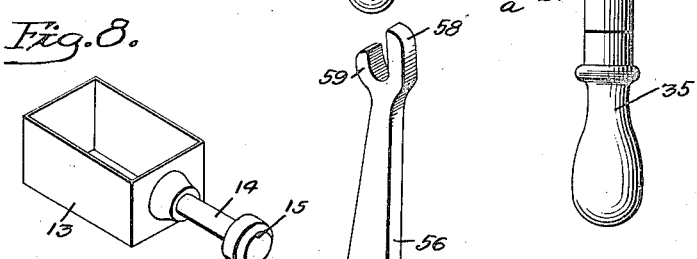
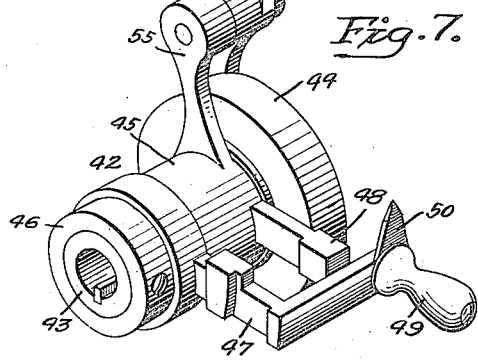

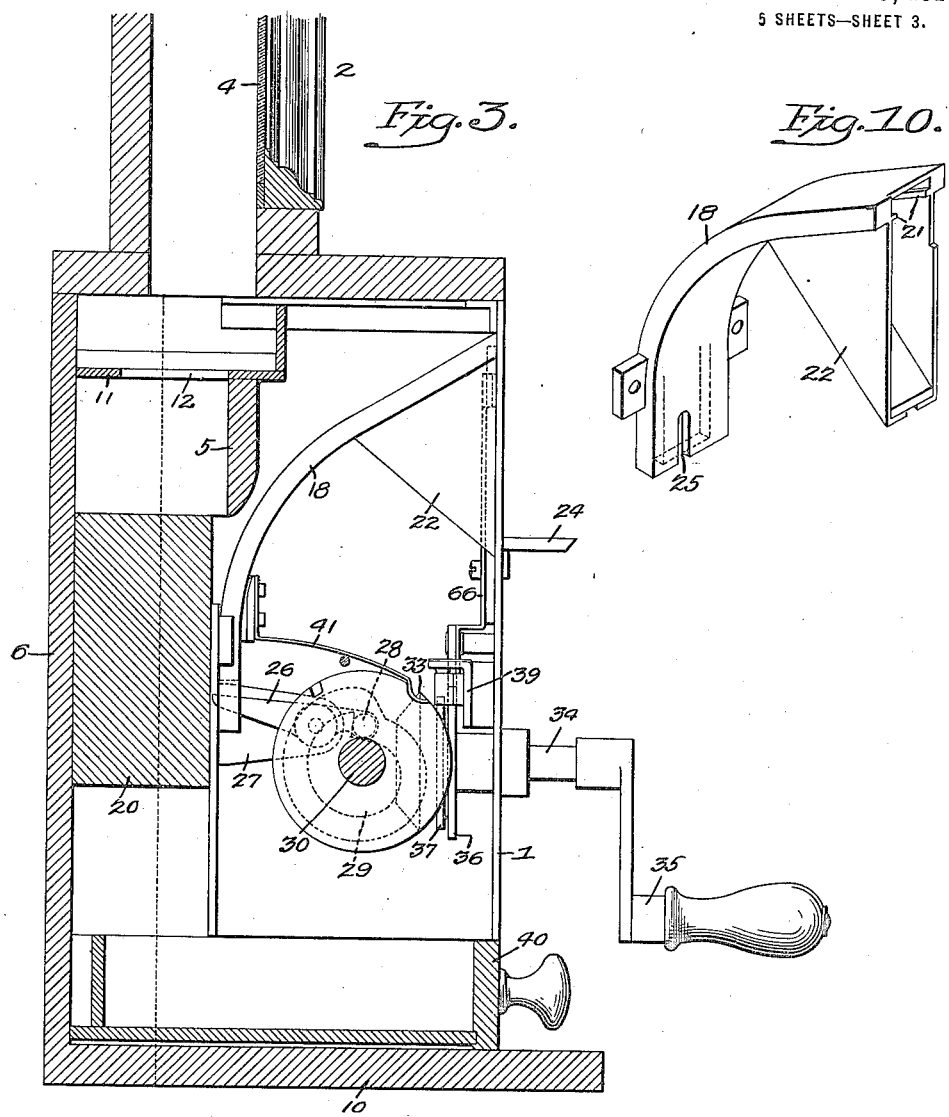

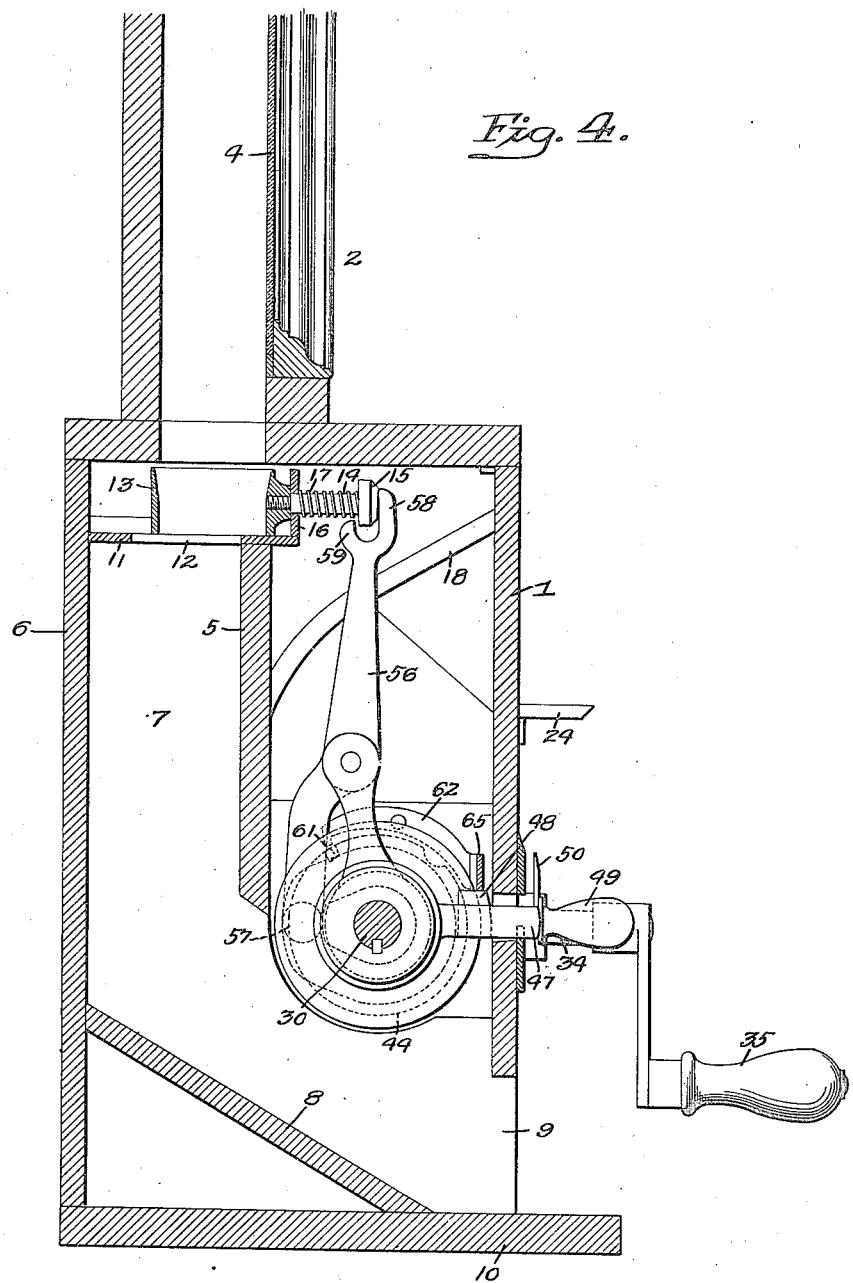

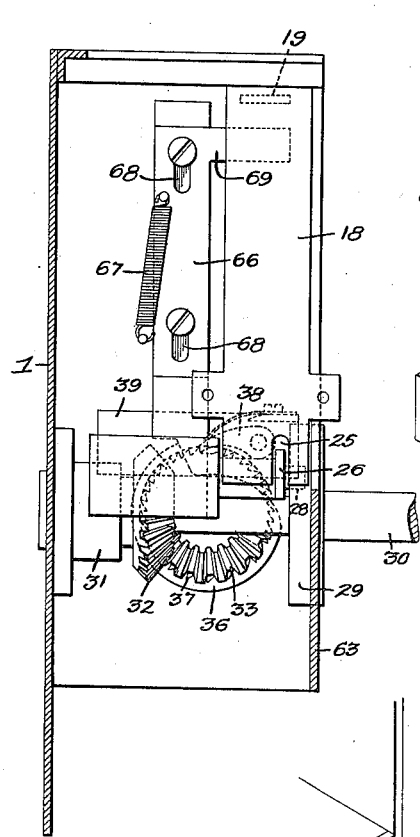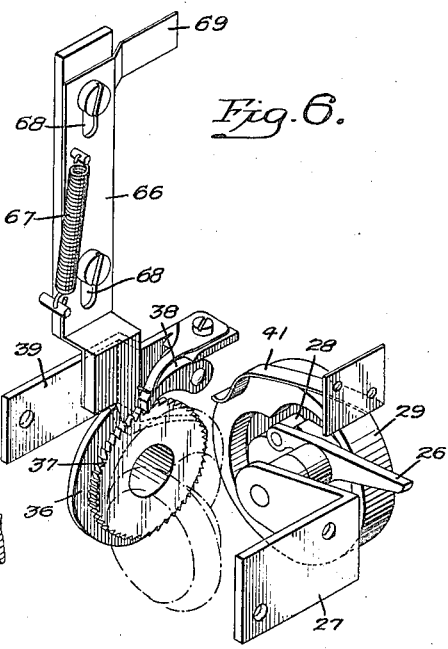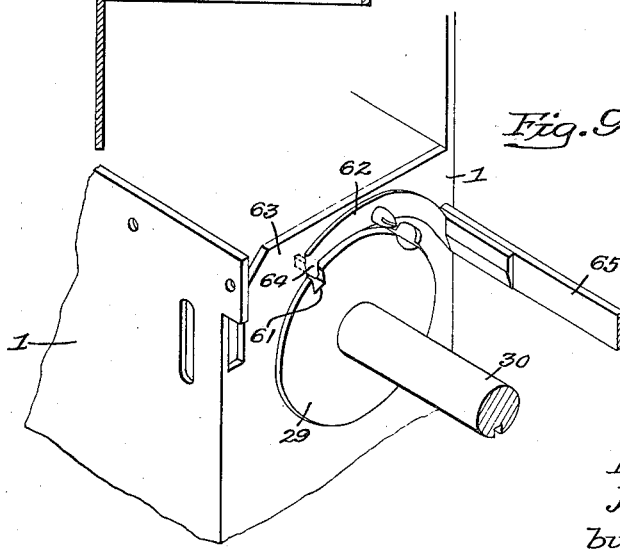

STEPHEN B. TILY, OF BALA, AND MARTIN O. REHFUSS AND JOHN G. REHFUSS, OF PHILADELPHIA, PENNSYLVANIA, ASSIGNORS TO JOHN WANAMAKER PHILADELPHIA, OF PHILADELPHIA, PENNSYLVANIA, A CORPORATION OF PENNSYLVANIA.

VENDING-MACHINE.

1,283,429.    Specification of Letters Patent.    Patented Oct. 29, 1918.

Application filed January 18, 1916. Serial No. 72,770.

*To all whom it may concern:*

Be it known that we, STEPHEN B. TILY, MARTIN O. REHFUSS, and JOHN G. REHFUSS, citizens of the United States, I, the said STEPHEN B. TILY being a resident of Bala, Montgomery county, State of Pennsylvania, and we, the said MARTIN O. REHFUSS and JOHN G. REHFUSS, being residents of Philadelphia, county of Philadelphia, State of Pennsylvania, have invented Vending-Machines, of which the following is a specification.

One object of our invention is to provide a relatively simple, compact and substantial arrangement of apparatus in which a coin or token of suitable denomination shall control the release of mechanism whereby any one of a number of different articles may be obtained from within a container, the invention contemplating novel means whereby fraudulent or unintentional operation of the device shall be effectually prevented.

A further object of the invention is to provide a machine whereby an article from any one of a number of different compartments or containers may be obtained by the deposit of a suitable coin in a controlling device and a subsequent manual operation of delivery mechanism common to all of said compartments;—the apparatus including a member adjustable at will into any of a number of positions depending on the compartment from which it is desired to obtain an article.

These objects and other advantageous ends we secure as hereinafter set forth, reference being had to the accompanying drawings, in which, Figure 1 is a perspective view on a reduced scale illustrating a vending machine constructed according to our invention;

Fig. 2 is a plan of one end of the lower or body portion of our machine;

Figs. 3 and 4 are vertical sections on the lines *a—a*, and *b—b*, Fig. 2;

Fig. 5 is a rear elevation, partly in section illustrating the device for closing the coin slot;

Fig. 6 is a perspective view of certain of the parts shown in Fig. 5, together with the coin actuated member;

Fig. 7 is a perspective view of the adjustable delivery carriage and its associated parts;

Fig. 8 is a perspective view of one of the delivery valves;

Fig. 9 is a perspective view of the device for locking the operating shaft while the delivery carriage is being adjusted; and Fig. 10 is a perspective view of the coin receiving chute.

In the above drawings 1 represents a horizontally elongated body casing containing the coin controlled delivery apparatus constituting part of our invention, upon which is mounted a relatively narrow, vertically extended case 2 preferably having a glass front 4 and divided by vertical partitions 3 into a number of vertically extending compartments each designed to receive a column or vertical series of boxes containing various articles to be vended, or, if desired, containing the articles themselves. All of said compartments open directly into the main casing or body 1 in which is mounted a vertical longitudinally extending partition or supporting member 5 defining with the back 6 of said casing, a delivery chute 7 common to all of the compartments and having a forwardly inclined bottom 8 designed to deliver articles falling from said chute 7 to an opening 9 elongated longitudinally of the casing 1 immediately adjacent the base member 10 thereof.

Preferably mounted at the top of the partition 5 and spaced away from the lower ends of the compartments of the case 2 is a horizontally extending plate 11 having in it under the various compartments of said case respectively a series of openings 12 preferably of the same section and dimensions as said compartments but in the present instance displaced to the rear of the latter. Immediately under each of the compartments and slidable on the plate 11 is a delivery valve 13 (Figs. 4 and 8) in the form of a substantially hollow rectangular structure or frame open at the top and bottom, having projecting from one end a stem 14 provided with a head 15.

Mounted upon the forward portion of the plate 11 and extending longitudinally of the body 1 is a second vertically mounted plate 16 through which the stems 14 of the valves 13 are slidable and on each of said stems between its head and said plate is a spring 17 normally maintaining the valve in its forward position in line with the compartment under which it is mounted but out of line with the corresponding opening 12 in the plate 11, which as shown in Fig. 4, leads directly into the opening of the chute 7. There is thus a horizontally extending line of valves 13, all of which are normally held in closed positions so that the lowermost of the articles in each of the various compartments, lies within and practically fills the valve below that compartment without being able to pass out of said valve, since it is held up by the forward edge of the plate as well as by the valve which it fits so snugly as to be incapable of tilting therein.

For controlling the operation of the several valves, we provide in the body 1 a coin chute 18 leading from a coin-receiving opening 19 in the front vertical face of said body adjacent one end thereof and terminating upon a block 20 fastened to the back 6 at a point about midway between the top and bottom of said body. As shown in Fig. 10, the front part of this coin chute has its lower side cut away to provide flanges or guides 21, which while designed to support within the chute a coin of predetermined denomination, will fail to support and guide downwardly a coin of some other denomination and therefore of different diameter. In such case said coin falls into an extension 22 of the coin chute having an inclined bottom which delivers it to a second slot 23 under the slot 19 through which it drops into a cup 24 projecting from the front face of the body 1.

The rear lower end of the coin chute has formed in it a vertically extending slot 25 into which extends a coin actuated lever 26 mounted on a bracket 27 projecting forwardly from the block 20. The forward end of said lever carries a roller 28 operative on a cam 29 fixed to an operating shaft 30 and this latter extends longitudinally of the body or main casing 1 in which it is carried in suitable bearings; one being indicated at 31, Fig. 2. This cam 29 includes an abutment or shouldered portion behind which the roller 28 normally rests so as to effectually prevent revolution of the shaft 30 in one direction, the parts of the lever 26 being so proportioned that the arm carrying said roller normally maintains the other arm of said lever elevated within the slot 25 of the coin chute, which it is noted, is placed to one side of the center line thereof. Fixed to the shaft 30 adjacent its bearings 31 is a beveled gear 32 meshing with a second beveled gear 33 fixed to a shaft 34 journaled in the front side of the body 1 and having a crank handle 35.

Also fixed to this latter shaft between the gear 33 and the front of the casing are a cam 36 and a ratchet wheel 37, of which the latter is acted on by a pawl 38 carried by a bracket 39 mounted on the front wall of the casing. The arrangement of the pawl and ratchet is such as to prevent revolution of the shaft 34 and hence of the shaft 30 in one direction while the roller 28 and cam 29 prevents its revolution, except under conditions hereafter noted, in the opposite direction.

As shown in Fig. 6, the cam 29 is provided with a groove in one face for the reception of the roller 28 and the arrangement is such that when a coin of proper denomination falls through the chute 18, it is finally brought to rest upon the projecting arm of the lever 26, which it turns on its pivot to an intermediate position with the roller in engagement with the upper edge of the cam slot which is so formed that a subsequent rotation of the shaft 30 will permit said roller to move within the slot to a position farther from said shaft and assume its final position in which the coin can roll off of the lever 26 into a coin receiving drawer 40 immediately under the same. At this time the lever 26 cannot return to its normal shaft-locking position, since the abutment on the cam 29 has advanced to such a point as to hold it in its upper or outer position.

As shown in Fig. 3, the cam 29 and its associated parts are normally held with the roller 28 of the lever 26 practically in contact with the shoulder or steep rise of the cam surface by means of a spring 41 whose bent extremity enters a notch in the periphery of the disk in which said cam surface is formed;—this arrangement insuring that when the lever 26 is engaged by a coin, its roller will occupy such a position that it may swing upwardly far enough to cause it to clear the shoulder when said cam is subsequently turned.

Splined to the shaft 30 is a delivery carriage 42 formed by an elongated sleeve 43 having rigidly fixed to or integral with it a cam 44 and loosely supporting a second sleeve 45. This latter sleeve is held from longitudinal movement by a removable collar 46 and has projecting from it two arms 47 and 48, of which the former has a crank-like handle 49 extending horizontally from its outer end. Said handle carries an upwardly extending index or pointer 50 and, as indicated in Figs. 1 and 4, the arm 47 projects through a slot 51 extending longitudinally of the body casing 1 and defined by a pair of metal strips 52 and 53. The upper edge of the lower strip is provided with a series of notches 54 for the reception of said arm 47;—there being a notch for each of the compartments in the case 2 and the parts are so proportioned that when the arm 47 lies in one of them, the headed end of the arm 48 lies upon the edge of the slot 51 formed in the front of the body 1 just inside of the plate 53. By raising the handle 49, the collar 45 may be slightly turned upon the sleeve 43 and the arm 47 lifted out of engagement with the slot 54, after which, by means of the handle, said sleeve with its attached parts may be caused to slide along the shaft 30 to any desired position in which, when the handle is released, said arm 47 may enter another slot.

The collar 45 carries also a third arm 55 serving as a support for the pivot or fulcrum of a lever 56 (Figs. 4 and 7) whose lower end carries a roller 57 operative in a groove formed in one face of the cam disk 44. The second arm of this lever projects upwardly and is forked at its upper extremity, the upper or forward branch 58 being longer than the inner branch 59 and the space between the branches being of such a width as to receive the edge of the head 15 of any of the valves 13. The various parts are so proportioned that when the arm 47 rests in any of the slots 54, the branch 58 of the lever 56 lies immediately adjacent the outer face of the head 15 of one of the valves while the branch 59 similarly lies adjacent to or engages the inner face of said head. The groove in the cam 44 is so designed that revolution of the shaft 30 and hence of the cam 44 will cause the lever 56 to first move the valve 13 inwardly out of line with its compartment and into line with the opening 12 over which it is mounted and thereafter return to the normal position shown in Fig. 4, in which it is again in line with its compartment.

In order to prevent rotation of the shaft 30 or any of its connected mechanism except at such times that the arm 47 rests in one of the slots 54, we provide a notch or recess 61 in the periphery of the cam disk 29 and mount a lever 62 on the wall 63 extending across the interior of the body casing 1 so as to isolate that part immediately above the money drawer 40 from the remainder thereof. While one arm of this lever is hooked or provided with a projection 64 placed to be capable of entering the notch 61, the other arm is extended in a line substantially parallel with the line of the pivot and is connected to a bar 65 resting upon or lying immediately over the head of the arm 48, so that regardless of the position of the delivery carriage 42, the movement upon it of the sleeve 45 by the upward movement of the arm 47 and handle 49, will necessarily swing on its pivot the lever 62, forcing its end 64 into the notch 61. As a consequence said lever locks the shaft from rotation whenever the arm 47 has been swung upwardly to an extent sufficient to allow the carriage 42 to be moved along the shaft 30.

In order to prevent a coin being inserted at any time other than when the parts are in their normal positions with the arm 47 in one of the notches 54 and the lever 56 in engagement with the head 15 of one of the valves 13, we provide on the shaft 34 a cam 36 and slidably mount above said cam a vertically elongated plate 66 whose lower end is normally held in engagement with the cam by a spring 67. This plate has vertical slots 68 for the reception of screws set in the front wall of the casing 1 whereby it is suitably guided and at its upper end it has a laterally projecting portion 69 of such a size as to fit over and close the outer end of the coin chute 18 when said plate is in its upper position. The cam 36 is so set on its shaft that as soon as the latter has been turned through a relatively small angle from its normal position, the plate 66 is moved up against the action of its spring 67 and thus moves its lateral extension 69 over the otherwise open end of the coin chute;—it being understood that as shown in Fig. 2, this extension lies practically in engagement with the inner face of the front wall of the body casing 1.

Under conditions of use the various compartments of the apparatus are filled with suitable articles or boxes containing the material to be sold, it being assumed that all of the articles in the various compartments are of the same value and in the present instance are intended to be sold for a nickel apiece. A person wishing to secure one of any of the different articles which are visible through the glass front of the case 2 first shifts the carriage 42 by means of the handle 49 to a position in which its index 50 extends in the vertical line of the compartment containing articles of the particular kind desired.

In order to so move the carriage, it is first necessary to raise the handle to cause the arm 47 to disengage the notch 54 in which it rests, and in so doing the arm 48 raises the bar 65, causing the end 64 of the lever 62 to enter the notch 61 of the cam 29 to temporarily lock the shaft 30 from rotation. When the index 50 is thus suitably placed, the release of the handle 49 permits the arm 47 to enter the corresponding notch in the plate 53 and by permitting the bar 65 to drop against the lever 62 releases the cam 29 and the shaft 30.

Obviously the handle 35 cannot now be turned since the shaft 30 is still locked from movement in one direction by the pawl 38 and ratchet 37 is likewise locked against movement in the opposite direction because the roller 28 of the lever 26 lies immediately behind the abrupt shoulder of the cam 29. If, however, a nickel be introduced through the coin slot 19, it will move by gravity down the chute 18 and come to rest upon the end of the lever 26, which it will turn to its intermediate position with the roller 28 almost clear of the upper edge of said abrupt shoulder of the cam 29. If now the handle 35 be turned in a clockwise direction, the weight of the nickel upon the lever 26 at once causes its rear end to complete its downward movement, since as before noted, the groove of the cam 29 now allows the roller 28 to swing up while the nickel is free to disengage the lever 26 and fall into the money drawer 40.

Obviously this movement of the cam causes the positioning spring 41 to disengage its notch and the continued revolution of the handle causes the shaft 30 to make a complete revolution which is terminated at the desired point by reason of the roller 28 again coming into engagement with the abrupt shoulder of the cam 29. This movement of the shaft 30 however likewise causes a complete revolution of the sleeve 43 and of the cam 44, thus oscillating the lever 56 on its pivot and causing its branch 58 to force rearwardly that particular valve 13 beneath the compartment which is vertically alined with the index 50.

As a consequence, the particular article or package lying within the hollow valve is brought over the opening 12, through which it falls onto the inclined bottom 8 and out through the opening 9. In the meantime the completion of the oscillation of the lever 56 allows the valve 13 under the action of its spring 17, to return to its normal position directly under and in line with its compartment, so that a second article or package falls into it, ready to be discharged upon a second movement of the lever.

As above noted, the revolution of the shaft 34 by the handle 35 causes the extension 69 to keep the coin-receiving slot 19 closed until just before the completion of such revolution, when the plate 66 returns to its normal position on the cam 36 and moves away from the entrance to the coin chute.

Obviously the introduction of a second nickel again frees the shaft 30 for another revolution and permits the delivery of a second article from the same compartment as that first indicated. On the other hand by means of the handle 49 the delivery carriage 42 may be shifted so that the forked end of its lever 56 will operatively engage the head of the valve of some other compartment, when the arm 47 again rests within the corresponding notch 54. The insertion of a nickel in the coin slot and the subsequent revolution of the handle 35 will then cause the delivery of an article from the last mentioned compartment, it being thus possible to cause a single coin-controlled device to govern the delivery of articles from any one of a number of separate and independent article-holding compartments.

We claim :—

1. The combination in a vending machine of a series of compartments; valves therefor; a delivery carriage manually slidable adjacent the compartments; a lever fulcrumed on the carriage for actuating any valve to deliver an article from the compartment associated therewith at will; and mechanism for turning the lever on its fulcrum after the carriage has been positioned to bring it into operative relation with any particular valve.

2. The combination in a vending machine of a series of compartments; a valve for each compartment; a carriage movable laterally of the compartments; valve operating means on the carriage including a lever and a cam for actuating the same; a device normally locking said means; with coin controlled mechanism for releasing said device and turning the cam.

3. The combination in a vending machine of a series of compartments; valves respectively controlling the delivery of articles from said compartments; a shaft; a carriage splined to said shaft and adjustable thereon transversely of the compartments; a valve operating device mounted on the carriage; and coin controlled mechanism normally preventing operation of said device.

4. The combination in a vending machine of a series of compartments; valves for said compartments; a shaft; a carriage adjustable on the shaft transversely of the compartments; a device mounted on the carriage and capable of detachably engaging any of the valves; means for turning the shaft to cause operation of said device; and coin controlled means for normally preventing turning of the shaft.

5. The combination in a vending machine of a series of compartments; valves for said compartments; a shaft; a carriage slidable on the shaft; a valve-operating device on the carriage formed to coöperate with any of the valves; means for turning the shaft to cause operation of the device; and means for positioning the carriage with the valve operating device in operative relation to any one of the valves.

6. The combination in a vending machine of a series of compartments; valves respectively controlling the discharge of articles from said compartments; a coin controlled operating shaft; a carriage slidable on said shaft and including a valve operating lever; and means actuated by rotation of the shaft for causing the lever to operate any one of the valves with which it has been properly positioned.

7. The combination in a vending machine of a series of compartments; a series of valves respectively controlling the delivery of articles from said compartments; a normally locked coin released operating shaft; a carriage splined to said shaft and including means whereby it may be manually adjusted thereon; a cam movable with the carriage and rotatable by the shaft; with a lever supported by the carriage and actuated by the cam to cause operation of any one of the valves with which it is placed in coöperative relation.

8. The combination in a vending machine of a series of compartments; a series of valves respectively controlling the delivery of articles from said compartments and each including a headed stem; a carriage manually adjustable transversely of the series of valves; a lever supported by the carriage and having an arm placed to detachably engage the headed stem of any of said valves; and means for causing oscillation of the lever after it has been operatively connected to any valve.

9. The combination in a vending machine of a series of compartments; valves for controlling the delivery of articles from said compartments respectively; a valve-controlling carriage movable transversely of the series of compartments; an operating arm for said carriage; means for definitely positioning the carriage with relation to each of the valves; and coin controlled means for operating any of the valves through the carriage.

10. The combination in a vending machine of a series of compartments; valves respectively controlling the delivery of articles from said compartments; an operating shaft; a carriage adjustable on said shaft and including means for transmitting power from the shaft to any valve; an operating arm for the carriage; and a plate having notches for holding said arm definitely positioned with relation to the valve operating means of a valve to be actuated.

11. The combination in a vending machine of a series of compartments; valves controlling the delivery of articles therefrom; a normally inoperative coin released shaft; a sleeve splined to said shaft and having a cam; a second sleeve mounted on the first sleeve; a lever fulcrumed on the second sleeve having one arm coacting with the cam and a second arm formed to coöperate with any one of the valves; with an arm for adjusting the sleeves on the shaft.

12. The combination in a vending machine of a series of compartments; valves controlling the delivery of articles therefrom; a normally inoperative coin released shaft; a sleeve splined to said shaft and having a cam; a second sleeve mounted on the first sleeve; a lever fulcrumed on the second sleeve having one arm coacting with the cam and a second arm formed to coöperate with any one of the valves; an arm for adjusting the sleeves on the shaft; and a plate having notches for holding the arm with its attached parts in any of a number of definite positions with the lever in operative connection with one of the valves.

13. The combination in a vending machine of a series of compartments; valves controlling the delivery of articles therefrom; a normally inoperative coin released shaft; a sleeve splined to said shaft and having a cam; a second sleeve mounted on the first sleeve; a lever fulcrumed on the second sleeve having one arm coacting with the cam and a second arm formed to coöperate with any one of the valves; an arm for adjusting the sleeves on the shaft; and means for preventing operation of the shaft except when the lever is in operative connection with one of the valves.

14. The combination in a vending machine of a series of compartments; valves controlling the delivery of articles therefrom; a normally inoperative coin released shaft; a sleeve splined to said shaft and having a cam; a second sleeve mounted on the first sleeve; a lever fulcrumed on the second sleeve and having an arm coacting with the cam, a second arm of the lever being formed to coöperate with any one of the valves; an arm for adjusting the sleeves on the shaft; and means for preventing operation of the shaft except when the lever is in operative connection with one of the valves; the same consisting of a bar actuated by the second sleeve; and a shaft holding member controlled by said bar.

15. The combination in a vending machine of a series of compartments; valves respectively controlling the delivery of articles from said compartments; a normally inoperative coin controlled operating shaft; a carriage adjustable on said shaft; valve actuating mechanism on said carriage including a rotary sleeve; an arm projecting from the carriage; a plate having notches for holding said arm with the valve operating mechanism in any of a number of predetermined positions; and means for locking the shaft from rotation except when said arm is in one of the notches.

16. The combination in a vending machine of a series of compartments; a series of valves for delivering articles from the compartments respectively and each having a headed stem; with a bodily slidable coin controlled device including a lever movable into operative relation with the head of any valve stem; and a member for turning said lever on its fulcrum after it has been positioned relatively to any valve.

17. The combination in a vending machine of a series of compartments; valves respectively controlling the delivery of articles from said compartments; a coin controlled shaft; a member manually adjustable longitudinally of the shaft into operative relation with any valve; with means for preventing rotation of the shaft except when said member is in operative connection with the valve.

STEPHEN B. TILY.
MARTIN O. REHFUSS.
JOHN G. REHFUSS.